UNITED STATES PATENT OFFICE.

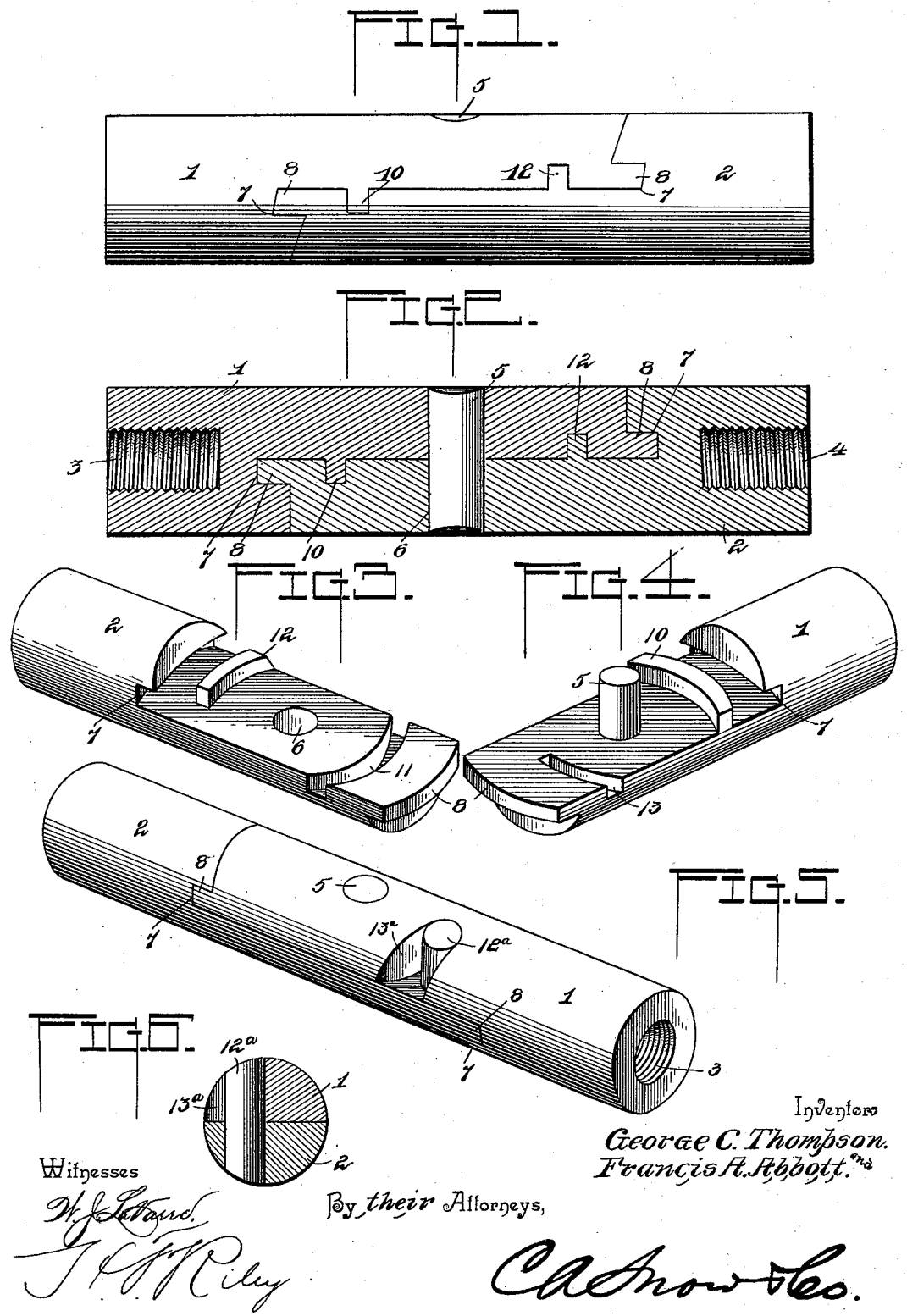

GEORGE CRANE THOMPSON AND FRANCIS ALVIN ABBOTT, OF SALINAS, CALIFORNIA.

COUPLING FOR PUMP-RODS, &c.

SPECIFICATION forming part of Letters Patent No. 594,043, dated November 23, 1897.

Application filed February 18, 1897. Serial No. 624,025. (No model.)

*To all whom it may concern:*

Be it known that we, GEORGE CRANE THOMPSON and FRANCIS ALVIN ABBOTT, citizens of the United States, residing at Salinas, in the county of Monterey and State of California, have invented a new and useful Coupling for Pump-Rods, Shafts, Bars, &c., of which the following is a specification.

The invention relates to improvements in couplings for pump-rods, shafts, bars, and the like.

The object of the present invention is to improve the construction of couplings for pump-rods, shafts, bars, and the like and to provide a simple, strong, and inexpensive device which will enable shafts, rods, and bars to be quickly coupled and uncoupled.

The invention consists in the construction and novel combination and arrangement of parts, as hereinafter fully described, illustrated in the accompanying drawings, and pointed out in the claims hereto appended.

In the drawings, Figure 1 is a side elevation of a coupling constructed in accordance with this invention. Fig. 2 is a longitudinal sectional view of the same. Figs. 3 and 4 are detail perspective views of the sections or members of the coupling. Fig. 5 is a perspective view of a coupling, illustrating a modification of the invention. Fig. 6 is a transverse sectional view of the same.

Like numerals of reference designate corresponding parts in all the figures of the drawings.

1 and 2 designate sections or members of a coupling for pump-rods, shafts, side bars of ladders, and the like, and the outer ends of the sections or couplings, which may be of any desired form in cross-section, are provided with threaded sockets 3 and 4 for the reception of the parts to be coupled. The sections or members when coupled are overlapped, the overlapped portions being reduced one-half in order that the coupling may be of the same diameter throughout its entire length. The section 1 is provided at the center of its reduced portion with a rigid pivot or pin 5, and the other section 2 is provided with a corresponding opening 6 for the reception of the pivot 5, and the sections turn on the said pivot 5 in interlocking them and disengaging them.

At the inner end of the reduced portion of each section is arranged a recess 7, and the outer end of the reduced portion of each section is provided with a projecting lip 8, which fits in the recess 7 of the other section. The lip 8 has its edge curved, and the transverse wall of the recess 7 is correspondingly curved to permit the sections to turn on each other and to provide a snug joint. The sections are further supported by a transverse rib 10, extending transversely of the inner face of the section 1 and interlocked with a transverse groove 11. The rib 10 and the groove 11 extend entirely across the sections of the coupling, and they are curved, being concentric with the curved edge of the lip and the curved wall of the recess 7.

In order to lock the sections of the coupling in alinement and limit the pivotal movement, one of the sections is provided with a lug or projection 12 and the other section is provided with a corresponding recess 13. The lug or projection 12 extends from the inner face of the section 2 and is curved, as shown, together with the recess 13; but instead of providing a projection or lug of the form shown in Figs. 3 and 4 of the drawings a projection or pin 12$^a$ and a recess 13$^a$ of the form illustrated in Fig. 5 may be used. By extending the projection or lug 12 entirely across the section 2 the parts may be uncoupled and coupled from either side.

It will be seen that the coupling is simple, strong, and durable, that it is quickly operated, and that it is applicable to pump-rods, shafts, ladders, and the like, and that the sections or members are firmly supported and enable a shaft to be employed in such operations as drilling, where the coupling is subjected to great strain.

What we claim is—

1. A coupling comprising two separable sections having reduced overlapped portions provided at their inner ends with recesses and having interlocking lips at their outer ends, one of the sections being provided with a pivot and the other having a corresponding opening, said lips and recesses holding the sections against separation when in alinement, and a lug or projection arranged to engage a recess at one side of one section and carried by the other section, said lug being adapted to hold the sections in alinement and being arranged to engage and disengage the recess automatically as the sections are turned on the pivot, substantially as described.

2. A coupling comprising two sections having reduced overlapped portions detachably pivoted and interlocked at their ends, one of the sections being provided with a curved rib 10 extending entirely across it, and the other section having a curved groove receiving the rib, substantially as described.

3. A coupling comprising two sections having reduced overlapped portions provided at their inner ends with recesses and having interlocking lips at their outer ends, one of the sections being provided with a pivot and the other having a corresponding opening, the curved rib 10 extending across one of the sections and fitting in a corresponding groove of the other, and the curved projection extending from the inner face of one of the sections and engaging a recess of the other, substantially as described.

In testimony that we claim the foregoing as our own we have hereto affixed our signatures in the presence of two witnesses.

GEORGE CRANE THOMPSON.
FRANCIS ALVIN ABBOTT.

Witnesses:
 THOS. P. JOY,
 FRANK HOOPER.